UNITED STATES PATENT OFFICE.

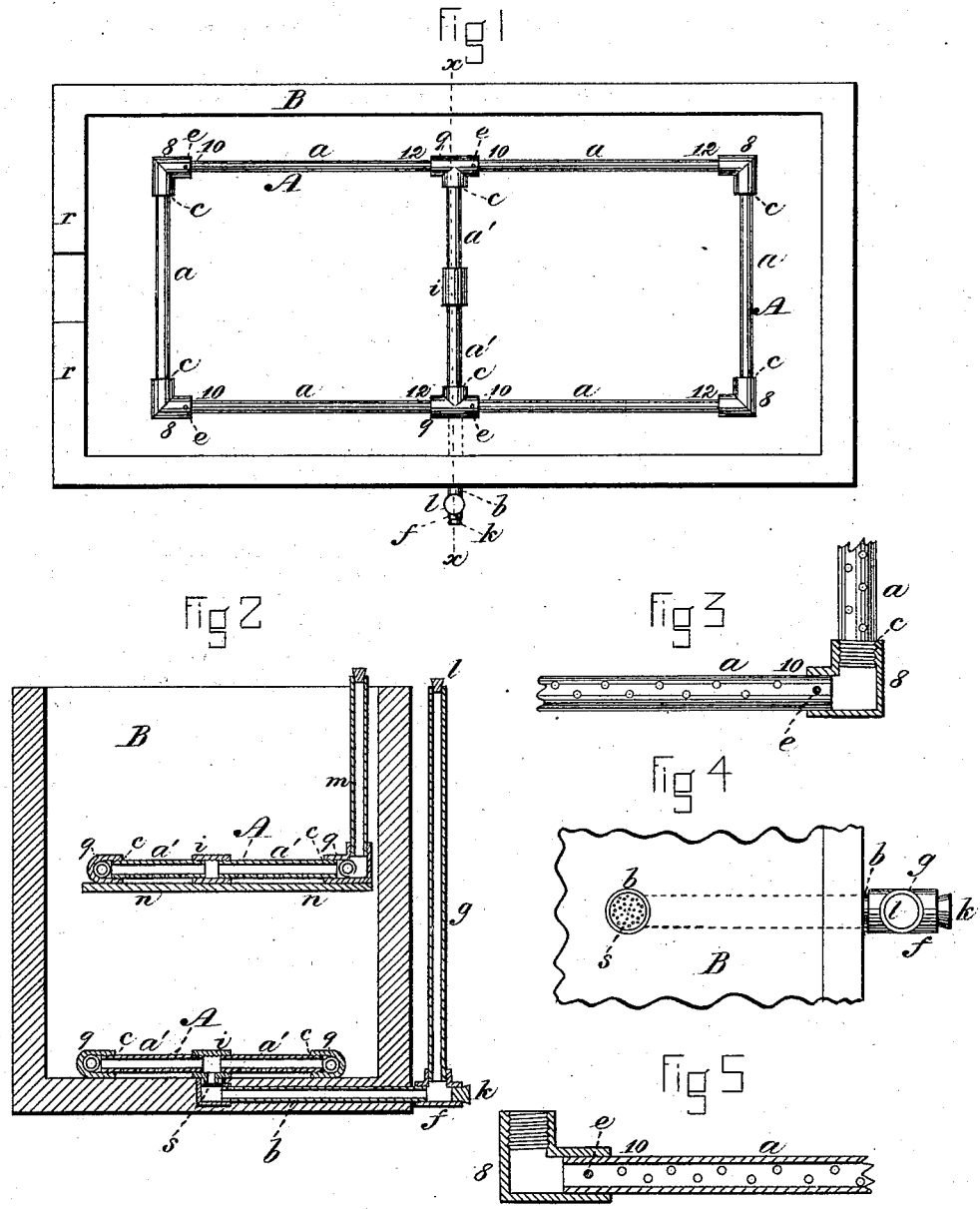

SAMUEL M. COLCORD, OF DOVER, MASSACHUSETTS.

METHOD OF AND DEVICE FOR PRESERVING ENSILAGE IN SILOS.

SPECIFICATION forming part of Letters Patent No. 280,352, dated July 3, 1883.

Application filed April 16, 1883. (No model.)

*To all whom it may concern:*

Be it known that I, SAMUEL M. COLCORD, of Dover, in the county of Norfolk and State of Massachusetts, have invented a new and Improved Method of Preserving Ensilage in Silos; and I do hereby declare that the following description thereof is sufficiently full, clear, and exact to enable others skilled in the art to make and use my said invention, reference being had to the accompanying drawings and the letters of reference marked thereon, making a part of this specification, in which—

Figure 1 is a top view of a silo ready to receive the ensilage, and showing a portion of my apparatus resting on the floor. Fig. 2 is a vertical section cut on the line $x\ x$ of Fig. 1. Fig. 3 is a portion of pipe on an enlarged scale, taken from one of the front corners of the apparatus and placed bottom side up to show the air-holes on its under side. Fig. 4 is a top view, on an enlarged scale, of a portion of the bottom of the silo before the principal portion of my apparatus has been placed in position, showing the upturned end of the drip-pipe and the strainer in its mouth. Fig. 5 is a section of a portion of pipe and elbow on an enlarged scale, showing the wooden peg which prevents the pipe from turning in its bearings.

When corn or other vegetable matter is cut up and put in a silo, it is essential for its preservation that atmospheric air should be eliminated or separated from it before it has time to heat or set up fermentation. The less air retained in the ensilage the less the chances of fermentation and the more perfectly it will be preserved in a sweet and wholesome condition for food, the detrimental chemical changes produced in the ensilage being always in proportion to the air retained in it. Heretofore the air has been expelled or partially expelled from silos by placing very heavy weights on the boards covering the top of the ensilage, the air escaping through the spaces or cracks between the said boards, the said spaces or cracks being the only places heretofore provided for the egress of air from a silo; but as silos are from twelve to twenty feet deep a large percentage of air has heretofore always remained in contact with the ensilage, especially in its central and lower portions, as the air cannot easily rise through the mass of ensilage to find an exit at the top. The heavy pressure heretofore resorted to for expelling the air from ensilage has a double disadvantage—first, that it renders very strong and expensive walls necessary for silos to resist the lateral pressure, and, second, that fermentation proceeds much more rapidly under heavy pressure than it otherwise would. It not unfrequently happens that two or three feet of water or juice from the ensilage is found at the bottom of a silo, and that fermentation has been very active in the central and lower part of its contents. It is therefore very desirable to know at all times the condition of the matter in the silo, especially in regard to temperature and fermentation, and by my invention these important features can be readily ascertained and fermentation prevented or arrested.

The object of my invention is to remove atmospheric air and other gases from a silo more speedily, more perfectly, and with less pressure than that with which it has heretofore been accomplished.

Another object of my invention is to enable me to produce a purer, sweeter, and more wholesome ensilage than has ever before been produced.

A further object of my invention is to enable me to ascertain from time to time the general condition of the contents of a silo as regards temperature and fermentation.

A still further object of my invention is to enable me to apply chemical antiseptic solutions to the contents of a silo for the purpose of preventing or arresting fermentation.

The nature of my invention consists in combining with a silo an apparatus by and through which the atmospheric air and other gases contained in the ensilage in said silo may escape and the water, juices, &c., from the ensilage may be drawn off.

It also consists in providing means by which chemical antiseptic solutions can be sprayed or distributed among the contents of a silo for the purpose of preventing or arresting fermentation.

It further consists in providing a device by means of which the temperature of the contents of a silo may at any time be ascertained and the commencement of fermentation detected.

I construct my apparatus as follows: I take iron pipes $a$ $a'$, of any dimensions desired, and join them together, so as to form a frame, A, with a continuous air-connection, (which also communicates with the drip-pipe $b$,) by screwing each of the ends of the pipes $a$ and $a'$ into its connecting-elbow 8 or coupling 9, as shown at $c$. The ends 10 and 12 of the pipes $a$ are thrust or telescoped into their connecting-elbows 8 and couplings 9, as shown in Figs. 1, 3, and 5. All the horizontal pipes excepting the drip-pipe $b$, which runs toward the side wall of the silo B, are perforated on their under side with holes about one-fourth of an inch in diameter and about six inches distant from each other, as seen in Figs. 3 and 5. The ends 10 of the pipes $a$ are each held in position by a small wooden peg or pin, $e$, as shown in Figs. 1, 3, and 5. A T-coupling, $f$, is screwed onto the projecting end of the drip-pipe $b$, and the vertical pipe $g$ is screwed into the upright branch of said coupling $f$, the vertical pipe $g$ affording an outlet or means of escape from the silo for the air and gases. The pipes $a'$ $a'$, which extend transversely across the center of the frame A from side to side, are screwed into the couplings 9 9 and $i$, the downward branch of the latter coupling fitting loosely within the upturned end of the drip-pipe $b$.

The water, juices, &c., from the ensilage are drawn off, when desired, through the drip-pipe $b$, the outer end of which is provided with a stopper, $k$; but a faucet may be employed instead of the stopper, if preferred. The mouth of the vertical pipe $g$, I close with a stopper, $l$. The apparatus for the bottom of the silo being in place, the cut corn is piled upon it in the usual way, and when the silo is about half full another apparatus or frame, A, not differing materially from that on the bottom of the silo, excepting that its vertical pipe $m$, which performs the same office as the vertical pipe $g$, and also has its mouth closed by a stopper, rises from the inside of the silo, as seen in Fig. 2.

For the better support of the second frame, A, it is placed on a skeleton platform, $n$, Fig. 2, composed of narrow strips of furring, and upon this platform $n$, with the frame A upon it, the cut corn is piled until the silo is filled. To secure the second frame, A, in its place on the skeleton platform $n$, nails or staples are driven into the platform for that purpose. As soon as the silo is filled the ordinary boards are put upon the top of the ensilage and the weight placed on said boards. When the freshly-cut corn is placed in the silo, it has not yet had time to become much wilted, if, indeed, it is wilted at all. Consequently the air which remains in contact with it there is in a much freer condition than it is after it has wilted, for through the operation of wilting the said air becomes much more intimately associated with it and much more difficult to separate from it. Therefore during the process of filling the silo containing my apparatus a large portion of the air in contact with the ensilage will be taken into the pipes $a$ $a'$, and escape into the surrounding atmosphere through the vertical pipes $g$ and $m$.

If fermentation sets in or heat is generated in the silo, it can be detected by the odor rising in either of the vertical pipes $g$ $m$, or by dropping a sensitive thermometer into either of said vertical pipes, or in any other suitable manner.

To prevent or arrest fermentation, chemical antiseptic solutions of any desired kind and in any desired quantity or strength can be poured into either of the vertical pipes $g$ or $m$, and be thus distributed into or among the ensilage. In opening the silo to remove the ensilage, when the first part of frame A of the apparatus is reached, the pipe $a$ nearest to the front end, $r$, of the silo B is pulled away from its connections with the adjacent longitudinal pipes $a$, and the latter are then also removed, the pegs $e$, which held the pipes $a$ in position, having been first taken out. A portion of the skeleton platform $n$ is then cut or sawed off. As the work of discharging the silo proceeds, on arriving at the central portion, the pipes $a'$, with their couplings 9 9 $i$, after the pegs $e$ have been removed, can be pulled out and lifted from their place and their adjacent longitudinal pipes $a$ drawn out, leaving only the pipe $a$ at the rear part of the silo to be removed when reached.

In building a new silo I place the drip-pipe $b$, Fig. 2, so that its upturned end will be flush with the surface of the bottom of the silo. Just below the surface of its upturned end I place a strainer, $s$, Figs. 2 and 4, which will allow water and juice to pass freely, but will arrest coarse pieces of matter. When liquid rises in the pipe $g$, it can be drawn off by removing the stopper $k$, and when it rises in the pipe $m$ it can be siphoned or pumped out. If desired, petcocks may be attached to the vertical pipes $g$ and $m$, outside the silo, for the purpose of ascertaining the pressure of gas or air in said pipes. The pipes may be galvanized, or japanned, or made of brass, as preferred.

I do not intend to confine myself to the use of any specific number of the frames A or apparatus as herein set forth, as two, three, or more such frames may be used in the same silo, as may be desired.

In putting my apparatus into a silo already built I drill a hole through its wall on a plane with the surface of its bottom, for the passage of the drip-pipe $b$, which is cemented at this point to prevent leakage around it. For a silo twelve feet wide, sixteen feet deep, and thirty-six feet long, I make the frame A of pipes preferably one inch in diameter, with elbows and couplings to fit them.

It is evident that a half-round pipe, or a pipe with a slot on its under side, or an inverted-V-shaped gutter might be substituted for the round pipe with holes on its under side, as herein described and shown. I do not therefore confine myself to any particular form of pipe or passage, but intend to use such form as may be found best adapted for the purpose.

The advantages of my invention are, first, cheaper silos, because less weight is required than has heretofore been used to expel the air. Consequently the walls of the silos do not require to be so strong, as the lateral pressure exerted is much less than heretofore; second, that antiseptic chemicals can be introduced to prevent or arrest fermentation; third, that the ensilage will be freer from acidity or other injury from fermentation, and purer, sweeter, and more wholesome for food; fourth, that the ensilage, when taken from the silo and opened up a little by the pitchfork, will very soon take on heat, and the saccharine and alcoholic fermentation will commence, so that said ensilage can be fed warm to the animal, thus furnishing a more palatable and more digestible ration than when fed cold, as it has heretofore been fed, excepting when mixed with warm water.

What I claim as my invention, and desire to secure by Letters Patent, is—

1. The combination, with a silo, of one or more pipes or passages arranged within the same, and adapted to receive and collect either air, gases, water, or juices from the ensilage, and provided with an outlet pipe or passage, whereby the air, gases, water, or juices are withdrawn from the ensilage in the silo and discharged into the surrounding atmosphere, and means afforded for introducing chemical antiseptic solutions into the ensilage, and also for ascertaining the temperature of the latter, substantially as and for the purpose set forth.

2. The combination, with a silo, of one or more frames, A, each composed of a series of pipes connected together by suitable couplings, and provided with an outlet or discharge pipe, $g$ or $m$, substantially as and for the purpose described.

3. The combination, with a silo, of the frame A, placed within the same, and composed of a series of perforated pipes connected together by suitable couplings, a horizontal drip-pipe, $b$, connected therewith, and having at its outer end an outlet controlled by a plug or faucet, and the vertical pipe $g$, connected with the drip-pipe, all constructed to operate substantially as and for the purpose set forth.

4. The combination, with a silo, of the frame A, composed of a series of pipes, $a\ a'$, having their ends 10 adapted to slide telescopically within their couplings, to facilitate their separation therefrom, and held in position by pegs or pins $e$, substantially as and for the purpose described.

5. The herein-described method of preserving ensilage in silos, the same consisting in withdrawing or removing therefrom the atmospheric air and gases, together with water, juices, &c., by means of pipes or passages arranged within the silo, and adapted to receive and collect the air, gases, water, and juices and discharge the same into the surrounding atmosphere, substantially as set forth.

Witness my hand this 11th day of April, A. D. 1883.

SAMUEL M. COLCORD.

In presence of—
 P. E. TESCHEMACHER,
 JOHN C. CROSMAN.